(12) United States Patent
Jünke

(10) Patent No.: US 8,459,683 B2
(45) Date of Patent: Jun. 11, 2013

(54) GANGWAY WITH AN ARTICULATED BRIDGE BETWEEN TWO VEHICLES COUPLED IN AN ARTICULATED MANNER

(75) Inventor: Volker Jünke, Felsberg (DE)

(73) Assignee: Hübner GmbH, Kassel (DE)

( * ) Notice: Subject to any disclaimer, the term of this patent is extended or adjusted under 35 U.S.C. 154(b) by 201 days.

(21) Appl. No.: 12/793,981

(22) Filed: Jun. 4, 2010

(65) Prior Publication Data

US 2010/0308558 A1    Dec. 9, 2010

(30) Foreign Application Priority Data

Jun. 8, 2009    (EP) .................................... 09007520

(51) Int. Cl.
*B61D 17/00*    (2006.01)

(52) U.S. Cl.
USPC ........................................ 280/403; 280/456.1

(58) Field of Classification Search
USPC .................. 280/403, 456.1; 105/18; 14/69.5, 14/71.1
See application file for complete search history.

(56) References Cited

U.S. PATENT DOCUMENTS

| | | | | |
|---|---|---|---|---|
| 3,711,146 A * | 1/1973 | Madzsar et al. | ........... | 296/180.2 |
| 4,579,063 A | 4/1986 | Losa et al. | | |
| 4,802,417 A * | 2/1989 | Kuker et al. | .................. | 105/8.1 |
| 5,010,614 A * | 4/1991 | Braemert et al. | .............. | 14/71.1 |
| 5,471,935 A * | 12/1995 | Goebels et al. | ............... | 105/458 |
| 5,515,792 A * | 5/1996 | Bullock et al. | ................. | 105/458 |
| 5,535,681 A * | 7/1996 | Sarnicki et al. | ............... | 105/458 |
| 5,596,936 A * | 1/1997 | Bullock et al. | ................. | 105/458 |
| 5,771,812 A * | 6/1998 | Britzke | ........................ | 105/458 |
| 6,292,968 B1 * | 9/2001 | McLain | ......................... | 14/71.1 |
| 7,338,060 B2 * | 3/2008 | Koch et al. | ..................... | 280/403 |
| 7,658,396 B2 * | 2/2010 | Koch et al. | ..................... | 280/403 |
| 2005/0104321 A1 * | 5/2005 | Koch et al. | ..................... | 280/403 |
| 2005/0200098 A1 * | 9/2005 | Koch et al. | ..................... | 280/403 |

FOREIGN PATENT DOCUMENTS

| | | |
|---|---|---|
| BE | 655628 A | 11/1963 |
| DE | 1 018 446 B | 7/1954 |
| DE | 947078 C | 8/1956 |
| EP | 0 583 491 A | 8/1992 |

\* cited by examiner

*Primary Examiner* — Kevin Hurley
*Assistant Examiner* — Michael Stabley
(74) *Attorney, Agent, or Firm* — Gifford, Krass, Sprinkle, Anderson & Citkowski, P.C.

(57) ABSTRACT

A gangway includes an articulated bridge which extends between two vehicles coupled in an articulated manner. The articulated bridge has, at both ends, an enclosed carriage whereby at least one enclosed carriage can be attached to the vehicle in such a manner that it may be displaced in a direction perpendicular to the lengthwise axis of the vehicle.

7 Claims, 2 Drawing Sheets

GANGWAY WITH AN ARTICULATED BRIDGE BETWEEN TWO VEHICLES COUPLED IN AN ARTICULATED MANNER

CROSS REFERENCE TO RELATED APPLICATION

This application claims priority of European Patent Application No. EP 09007520.1-2422 filed Jun. 8, 2009.

FIELD OF THE INVENTION

The present invention relates to a gangway with an articulated bridge between two vehicles which are coupled in an articulated manner.

BACKGROUND OF THE INVENTION

Articulated bridges are sufficiently known from the prior art. For example, from the EP 583 491 B1, an articulated bridge is known in which an insertion opening is located in each case in the floors of the vehicles coupled in an articulated manner, whereby the articulated bridge is anchored such that it can move along the axis parallel to the lengthwise axis of the vehicle. The articulated bridge itself is thereby centered between the two vehicles, such that each end of the articulated bridge is provided with a leaf spring which abuts the housing of the vehicle at one end, and at the other end rests against the articulated bridge. The leaf spring ensures—as has already been pointed out—that the articulated bridge always remains in a somewhat central position relative to the two vehicles as they move. As has already been explained, the articulated bridge is inserted in the insertion opening of each vehicle in such a manner that it can move in the lengthwise direction. It is thereby possible for the articulated bridge to yield to the movement occurring when the two vehicles move transversally relative to each other, as occurs, for example, when the vehicle is moving through an S-shaped curve. It should be noted particularly that an articulated bridge can accommodate an angle, i.e. a deflection along the lengthwise axis of the vehicles, of 45°.

BRIEF DESCRIPTION OF THE INVENTION

As has already been explained, the vehicles contain in each case a so-called insertion opening for receiving the articulated bridge. There are, however, vehicles known which are not provided with such an insertion opening. This means that the space for the articulated bridge is reduced by the depth of the respective insertion opening. The insertion opening itself has a depth of approximately 300 mm, whereby a depth of this size—as has already been noted—allows for a displacement of the articulated bridge of approximately 45° parallel to the lengthwise axis. If it is the case that the articulated bridge can not be accommodated in an insertion opening of this sort, but instead the articulated bridge is coupled directly to the ends of the two vehicles which are connected in an articulated manner at its ends, then a maximum displacement of only 30° relative to the lengthwise axis of the vehicle is possible. This means that transversal movements, such as can occur when a vehicle of this sort is driven through a curve, are only possible with such a construction when the rotation of the articulated bridge does not exceed 30°, or the articulated bridge is disengaged from the vehicle.

Accordingly, the underlying task of the invention is to create an articulated bridge which can be attached directly to the end of the vehicle without using the respective insertion opening in the vehicle, whereby however the rotation angle of the articulated bridge relative to the lengthwise axis of the vehicle may obtain an angle of 45°.

The task is accomplished by the invention in that the articulated bridge of a gangway between two vehicles coupled in an articulated manner has an enclosed carriage at each end, whereby at least one of the enclosed carriages can be accommodated by the vehicle such that it can be displaced in a direction perpendicular to the lengthwise axis of the vehicle. Ideally, however, it is the case that the enclosed carriages, whereby the articulated bridge is anchored at its ends, can be accommodated at both ends of the articulated bridge by the respective vehicles in a manner such that it can be displaced. Particularly with transversal movements, the articulated bridge is thereby capable of yielding to the movement of the vehicles by displacing the articulated bridge in a direction parallel to the crosswise axis of the vehicle, without requiring that the rotation of the articulated bridge exceed an angle of greater than 45° to the lengthwise axis of the vehicle.

Advantageous characteristics and further embodiments can be derived from the subsidiary claims.

In this manner, it is the specific intention that in order to obtain the displaceable accommodation of the enclosed carriage, a guidance unit located on the vehicle is provided. The guidance unit for a displaceable accommodation of the enclosed carriage of the articulated bridge contains at least one, ideally, however, two parallel track assemblies. Track assemblies of this sort are constructed as dovetail guides, and allow accordingly for movement parallel to the lengthwise axis of the tracks. Due to the construction of the dovetail guide, the tracks cannot be disconnected by lifting. Furthermore, it is intended that the, at least one, track assembly is located on one of the cross beams located on the vehicle.

In order to ensure that the enclosed carriages return to a basically central position after a displacement has occurred, spring elements are provided at both sides which ensure that the enclosed carriages are centered on the cross beam.

To further ensure that the enclosed carriages are displaced only when a certain effective force to the enclosed carriages, or respectively, the articulated bridge, has been exceeded, a so-called break-away device is located underneath the enclosed carriages on the cross beam. A break-away device of this sort contains a spring loaded retention element, e.g. a sphere or a pin with a spherical head which is seated in a spring loaded manner in a corresponding recess in the enclosed carriage or the cross beam. From this it is clear that when the force to the cross beam for displacing the enclosed carriage exceeds a certain value, the spring loaded retaining element, such as a sphere, is deflected in the direction of the spring and thereby allows the enclosed carriage to be displaced. In this manner, a break-away device of this sort ensures that the articulated bridge will not become unstable during normal driving movement, in other words with transversal displacement of less than 30°.

It is furthermore intended that the articulated bridge is anchored such that it can move against the force of a spring, particularly a leaf spring, parallel to the lengthwise axis of the vehicle. As a result, it is clear that the enclosed carriage assumes the task which was previously assumed in the prior art by the insertion opening in the vehicle itself. The articulated bridge, which contains sliding joints as well as hinged joints, is constructed such that the sliding and hinged joints are disposed in frame tracks perpendicular to the lengthwise axis of the vehicle. It is also conceivable however, to configure the slide and hinged joints parallel to the lengthwise axis.

In order to eliminate a step from the actual articulated bridge to the floor of the vehicle, so-called deck plates are provided, which are attached by hinges at one end to the vehicle, and can move freely in relation to the articulated bridge at the other end.

BRIEF DESCRIPTION OF THE DRAWINGS

In the following, the invention will be explained in greater detail with the help of the drawings.

DETAILED DESCRIPTION OF THE INVENTION

Figure 1:
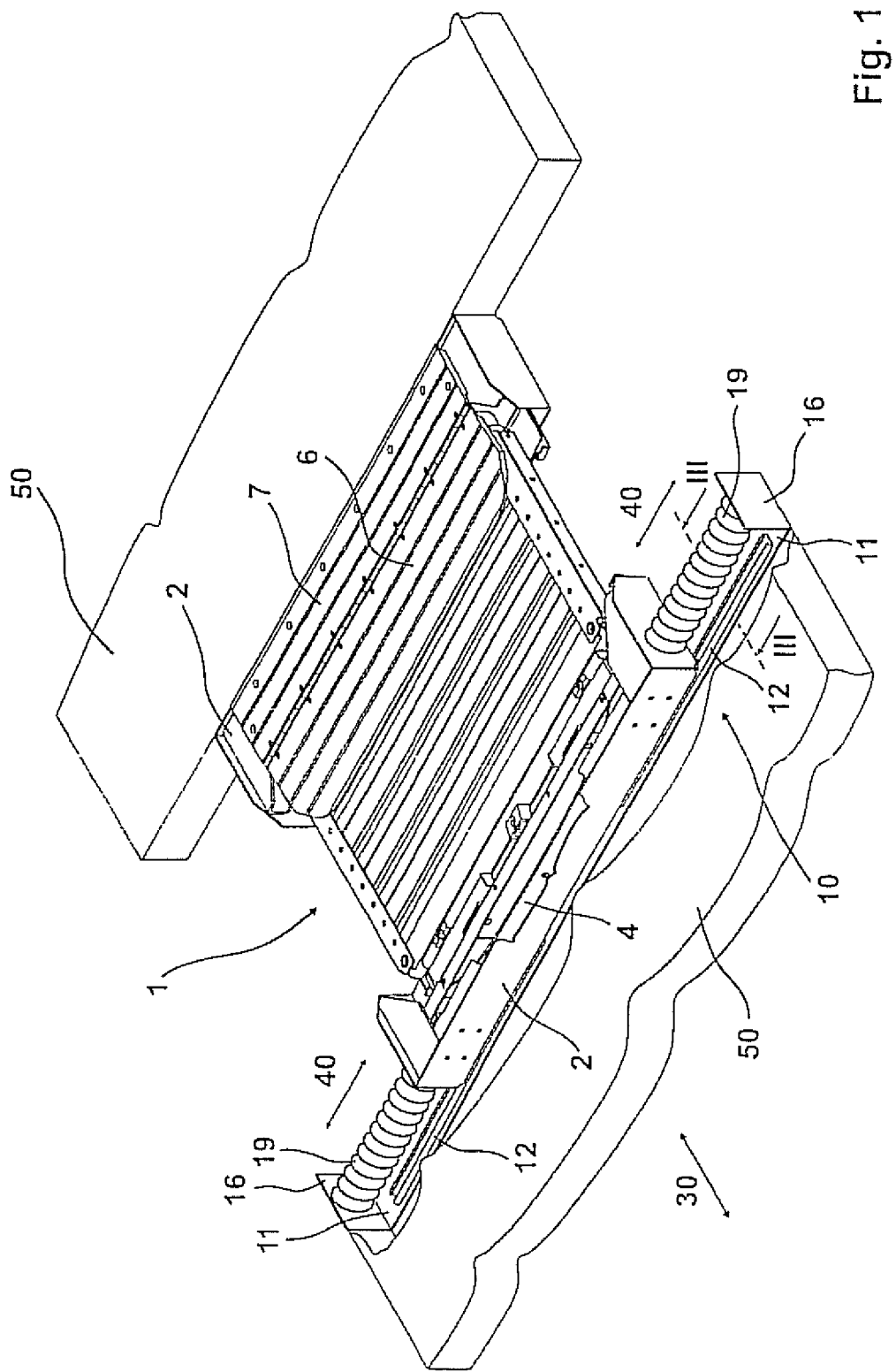
FIG. 1 shows the articulated bridge in a perspective view, whereby the vehicle is only schematically indicated.
Figure 2:
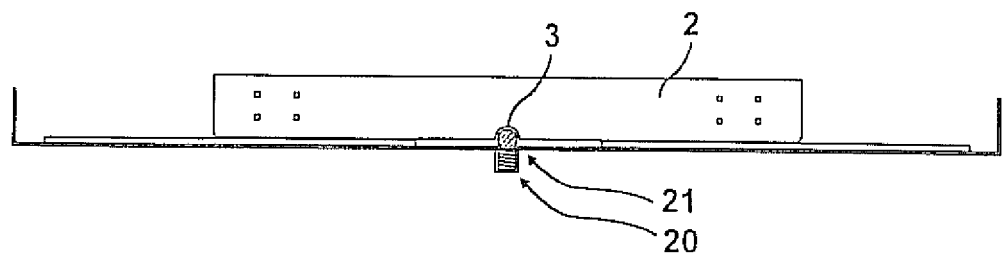
FIG. 2 shows the break-away device as a means of attaching the enclosed carriage to the track assembly, or respectively, the cross beam.
Figure 3:
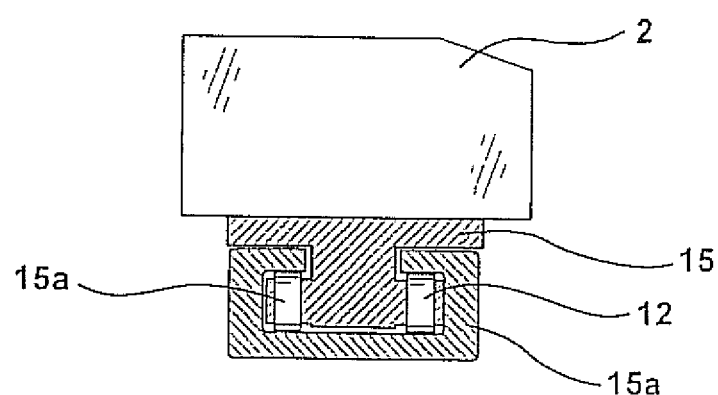
FIG. 3 shows a section in accordance with the line III-III from FIG. 1.

In accordance with FIG. 1, the articulated bridge as a whole is indicated by the number 1. The articulated bridge 1 contains at each side an enclosed carriage 2, whereby in the enclosed carriage the articulated bridge indicated by the number 1 is anchored in such a manner that it can move in the direction of the arrow 30 along the lengthwise axis of the vehicle 50. The articulated bridge is supported on the wall of the enclosed carriage by a leaf spring 4. A hinged deck plate 6 is located on the transition from the actual articulated bridge 1 to the floor of the vehicle, which then becomes a gangway plate 7, which is a part of the enclosed carriage 2. In the present embodiment, the one enclosed carriage located such that it can move along a track 10 in the direction of the double arrow 40. The enclosed carriage at the other end is statically attached to the end of the vehicle. A practical embodiment is also possible whereby the two enclosed carriages 2 are attached in each case to a guidance unit 10 such that they can be displaced in a direction perpendicular to the lengthwise axis of the vehicle. The guidance unit 10 contains a cross beam 11 on which two parallel dovetail shaped tracks 12 are arranged. The construction of such a track can be seen in FIG. 3. The track accepts a roller carriage 15 on which the enclosed carriage 2 rests. The roller carriage 15 contains two rollers 15a, which are contained by the dovetail shaped track 12 and can move therein. The cross beam 11 contains a side wall 16, whereby a coil springs 19 are located between the side wall 16 and the enclosed carriage 2. Said coil springs 19 are on each side of the enclosed carriage 2, whereby it is ensured that the enclosed carriage will always return to a middle position following a displacement. This means that by means of the springs, the enclosed carriage will be centered at approximately the middle of vehicle along the lengthwise axis.

In order to ensure that the enclosed carriage does not yield to smaller forces applied to the enclosed carriage, thereby displacing said enclosed carriage, a so-called break-away device 20 is incorporated. The break-away device 20 contains a spring-loaded sphere 21 located on the underside of the cross beam, which rests in a corresponding seating 3 in the shape of a recess on the underside of the enclosed carriage 2. By means of adjusting the force of the spring, the break-away device can be configured for the lateral force to the sled at which the sled will actually be displaced laterally in the direction corresponding to the double arrow 40. It has already been explained elsewhere that when an articulated bridge of this sort is attached directly between two vehicles, said articulated bridge must be relatively short. This is because the distance separating the two vehicles coupled in an articulated manner is determined by the length of the coupling device. The possible transversal displacement of a relatively short bridge of this sort is approximately 30°. This is—as has already been explained—basically too small when driving through some S-curves, such that when the articulated bridge is not disengaged, there is a danger of permanent damage to the articulated bridge as a result of structural deformation. If the articulated bridge can be displaced with its enclosed carriage 2 on the guide unit 10 in one direction or the other, then there is the possibility once again of passing through S-shaped curves, which would require a rotation of the articulated bridge of greater than 30°, without causing permanent damage to the articulated bridge through structural deformation.

The invention claimed is:

1. A gangway with an articulated bridge configured to be disposed between two moving vehicles coupled in an articulated manner, wherein the articulated bridge has a first enclosed carriage at a first end thereof, said carriage being connectable to a one of said vehicles by a guidance unit associated with said bridge, said guidance unit including a track which extends in a direction perpendicular to the lengthwise axis of said vehicle, and wherein said carriage engages its guidance unit via said track so that said enclosed carriage can be displaced laterally in a direction perpendicular to the lengthwise axis of the vehicle to which it is connectable, whereby said bridge can move transversally to said lengthwise axis of said vehicle in the region of its junction thereto.

2. A gangway with an articulated bridge in accordance with claim 1, characterized in that the, at least one, track assembly is located on a cross beam on the vehicle.

3. A gangway with an articulated bridge in accordance with claim 2, characterized in that the cross beam is connected to the enclosed carriage by means of a break-away device which is configured and operable to terminate the connection of said cross beam to said enclosed carriage when a predetermined displacement of said carriage in a direction perpendicular to the lengthwise axis of the vehicle to which it is connected is exceeded.

4. A gangway with an articulated bridge in accordance with claim 3, characterized in that the break-away device is comprised of a spring loaded retention element which rests in a corresponding seating in the enclosed carriage or in the cross beam.

5. A gangway with an articulated bridge in accordance with claim 1, characterized in that the enclosed carriage is centered by means of spring elements located on each side.

6. A gangway with an articulated bridge in accordance with claim 1, characterized in that the articulated bridge is anchored to the enclosed carriage in opposition to the force of a spring and is displaceable in a direction parallel to the lengthwise axis of the vehicle.

7. A gangway with an articulated bridge in accordance with claim 6, characterized in that the spring is constructed as a leaf spring extending over the width of the housing.

* * * * *

UNITED STATES PATENT AND TRADEMARK OFFICE
CERTIFICATE OF CORRECTION

PATENT NO. : 8,459,683 B2  
APPLICATION NO. : 12/793981  
DATED : June 11, 2013  
INVENTOR(S) : Junke Page 1 of 1

It is certified that error appears in the above-identified patent and that said Letters Patent is hereby corrected as shown below:

In the Claims

Column 4, line 24, Delete "to a one", Insert --to one--

Signed and Sealed this
Nineteenth Day of May, 2015

Michelle K. Lee
*Director of the United States Patent and Trademark Office*